United States Patent
Gerards et al.

(10) Patent No.: US 9,388,907 B2
(45) Date of Patent: Jul. 12, 2016

(54) FLAP HINGES SYSTEM FOR A FLAP SHAFT IN A MOTOR VEHICLE

(71) Applicant: PIERBURG GMBH, Neuss (DE)

(72) Inventors: Hans Gerards, Gangelt (DE); Andreas Grauten, Krefeld (DE)

(73) Assignee: PIERBURG GMBH, Neuss (DE)

( * ) Notice: Subject to any disclaimer, the term of this patent is extended or adjusted under 35 U.S.C. 154(b) by 15 days.

(21) Appl. No.: 14/398,471

(22) PCT Filed: Apr. 5, 2013

(86) PCT No.: PCT/EP2013/057243
§ 371 (c)(1),
(2) Date: Nov. 3, 2014

(87) PCT Pub. No.: WO2013/164155
PCT Pub. Date: Nov. 7, 2013

(65) Prior Publication Data
US 2015/0083956 A1  Mar. 26, 2015

(30) Foreign Application Priority Data

May 4, 2012 (DE) .......................... 10 2012 103 926

(51) Int. Cl.
*F16K 1/22* (2006.01)
*F02D 9/04* (2006.01)
*F02D 9/10* (2006.01)

(52) U.S. Cl.
CPC . *F16K 1/224* (2013.01); *F02D 9/04* (2013.01); *F02D 9/106* (2013.01)

(58) Field of Classification Search
CPC ............ F16K 1/224; F02D 9/04; F02D 9/106
See application file for complete search history.

(56) References Cited

U.S. PATENT DOCUMENTS

| 4,604,254 A |   | 8/1986 | Yamamoto et al. |
| 4,981,284 A | * | 1/1991 | Imamura ................. F02D 9/106 251/305 |
| 5,188,078 A | * | 2/1993 | Tamaki ................. F02D 9/1065 123/184.61 |
| 5,342,019 A | * | 8/1994 | Braun ..................... F02B 37/22 137/315.22 |
| 5,615,861 A | * | 4/1997 | Pollmann ................. F02D 9/10 123/403 |
| 5,630,571 A | * | 5/1997 | Kipp ........................ F02D 9/06 251/214 |

(Continued)

FOREIGN PATENT DOCUMENTS

| CN | 102278210 A | 12/2011 |
| DE | 2 038 225 A1 | 3/1972 |

(Continued)

*Primary Examiner* — Craig Schneider
*Assistant Examiner* — Kevin Barss
(74) *Attorney, Agent, or Firm* — Norman B. Thot

(57) ABSTRACT

A flap bearing system for a flap shaft in a motor vehicle includes a first radial bearing within which is arranged a flap shaft comprising a flap shaft end. A ratable flap body is arranged on the flap shaft. A flow cross-section of a channel housing is controllable by rotating the flap shaft with the flap body. A first bearing housing surrounds the first radial bearing. A bearing housing cover comprises an opening through which the flap shaft end protrudes. The bearing housing cover closes the first bearing housing. A sleeve radially surrounds a section of the first bearing housing. A circumferential groove is formed at an outer circumference at the section of the first bearing housing surrounded by the sleeve. The flap shaft end protruding from the first bearing housing is arranged geodetically so as to be at a same height or above an opposite flap shaft end.

14 Claims, 2 Drawing Sheets

(56) References Cited

U.S. PATENT DOCUMENTS

| | | | | |
|---|---|---|---|---|
| 5,687,691 A | * | 11/1997 | Kaiser | F02D 9/106 |
| | | | | 123/337 |
| 5,777,412 A | * | 7/1998 | Yamamoto | F02D 11/10 |
| | | | | 123/337 |
| 5,992,378 A | | 11/1999 | Parkinson | |
| 6,273,058 B1 | | 8/2001 | Wagner | |
| 7,171,804 B2 | | 2/2007 | Terashima | |
| 2006/0059902 A1 | * | 3/2006 | Gerards | F16K 27/0218 |
| | | | | 60/324 |
| 2006/0059903 A1 | | 3/2006 | Gerards et al. | |
| 2008/0168767 A1 | | 7/2008 | Kanzawa et al. | |
| 2011/0278486 A1 | | 11/2011 | Brozio | |

FOREIGN PATENT DOCUMENTS

| | | |
|---|---|---|
| DE | 37 07 904 A1 | 9/1988 |
| DE | 195 26 144 A1 | 1/1997 |
| DE | 198 57 957 A1 | 6/2000 |
| DE | 100 06 795 A1 | 2/2001 |
| DE | 10 2004 046 076 A1 | 4/2006 |
| JP | 4-8735 U | 1/1992 |
| JP | 8-121198 A | 5/1996 |

* cited by examiner

FLAP HINGES SYSTEM FOR A FLAP SHAFT IN A MOTOR VEHICLE

CROSS REFERENCE TO PRIOR APPLICATIONS

This application is a U.S. National Phase application under 35 U.S.C. §371 of International Application No. PCT/EP2013/057243, filed on Apr. 5, 2013 and which claims benefit to German Patent Application No. 10 2012 103 926.7, filed on May 4, 2012. The International Application was published in German on Nov. 7, 2013 as WO 2013/164155 A1 under PCT Article 21(2).

FIELD

The present invention relates to a flap bearing system for a flap shaft in a motor vehicle, comprising a radial bearing, in which the flap shaft, having a flap body arranged thereon, is arranged in a rotatable manner, a channel housing, the flow cross-section of which can be controlled by rotating the flap shaft with the flap body, a bearing housing that surrounds the radial bearing in a radial manner, a bearing housing cover that closes the bearing housing in an axial manner having an opening through which a flap shaft end protrudes from the bearing housing, and a sleeve that surrounds the bearing housing in a radial manner at least in sections.

BACKGROUND

Various flap bearing systems in motor vehicles have previously been described. Particularly in flaps arranged in thermally stressed areas, it is desired to achieve a good heat dissipation on the side of engagement by the actors in order to protect adjusters, particularly electric adjusters, from overheating. For this reason, particularly in exhaust gas flaps, use is made of flap bearing systems whose bearings are, toward the outside, not fully arranged in a closed housing but are formed partially open toward the outside. This has the effect that the heat transported via the flap shaft can be at least partially dissipated via the surroundings.

These flap bearing systems must further be suited to compensate for thermal expansion in the valve shaft or the bearing sites so as to safeguard the smooth running of the flap shaft. For this purpose, it is required to avoid depositions on the flap shaft in the area of the bearing support to the largest possible extent. Various measures have consequently become known to effect a good inner and outer sealing tightness at the flap valve bearing site.

DE 195 26 144 A1 and DE 100 06 795 A1, for example, describe an arrangement of the throttle flap whose flap shaft is supported, on its side facing toward the actuator, via a radial bearing arranged in a bearing housing. An axial bearing washer is additionally arranged in the bearing housing for sealing purposes, which, having a corresponding shape, is arranged in abutment against a conical shoulder of the flap shaft. This axial bearing washer is pressed against an axial wall enclosing the bearing housing, wherein, to this effect, a pressure spring is arranged to bias the shaft and thus the shaft shoulder towards the axial wall. The spring is surrounded by a sleeve extending beyond the edge of the bearing housing.

DE 37 07 904 A1 describes a flap valve for an exhaust gas conduit whose shaft is supported in a ceramic sleeve having a calotte-shaped outer contour via which the sleeve is pressed, in a spring-loaded manner, into a correspondingly shaped bearing housing portion. The bearing housing portion receiving the sleeve is largely, but not fully, closed by a cover.

These valve bearing systems are effective to reduce, by means of the sleeve, the quantity of splash water to which the bearing site is exposed during operation. However, ingress of splash water cannot be entirely prevented because, since thermal stresses will cause different degrees of expansion of the materials, a gap must be provided between the bearing housing and the sleeve to prevent component parts from grinding against or getting caught with each other. As a result, however, splash water can intrude into the bearing area via the gap, become distributed along the shaft and, inter alia because of thermal stresses, will evaporate there resulting in deposits between the shaft and the bearing that may lead to a malfunction. Once water has intruded into this area, this water cannot be easily removed from the bearing area due to the relatively small gap and therefore will remain in the interior.

SUMMARY

An aspect of the present invention is to provide a flap bearing system for a flap shaft in a motor vehicle where the bearing system is exposed to the smallest possible quantities of splash water and where splash water that has intruded can be removed from the bearing area so as to avoid deposits in the area of the shaft bearing support.

In an embodiment, the present invention provides a flap bearing system for a flap shaft in a motor vehicle which includes a flap shaft comprising a flap shaft end. A flap body is arranged on the flap shaft and is configured to rotate. A first radial bearing has the flap shaft arranged therein. A channel housing is configured so that a flow cross-section thereof is controllable by rotating the flap shaft with the flap body. A first bearing housing is configured to radially surround the first radial bearing. A bearing housing cover comprises an opening configured to have the flap shaft end protrude therethrough. The bearing housing cover is configured to axially close the first bearing housing. A sleeve is configured to radially surround at least a section of the first bearing housing. A circumferential groove is formed at an outer circumference at the section of the first bearing housing surrounded by the sleeve. The flap shaft end protruding from the first bearing housing is arranged geodetically so as to be at a same height or above an opposite flap shaft end.

BRIEF DESCRIPTION OF THE DRAWINGS

The present invention is described in greater detail below on the basis of embodiments and of the drawings in which.

DETAILED DESCRIPTION

Figure 1:
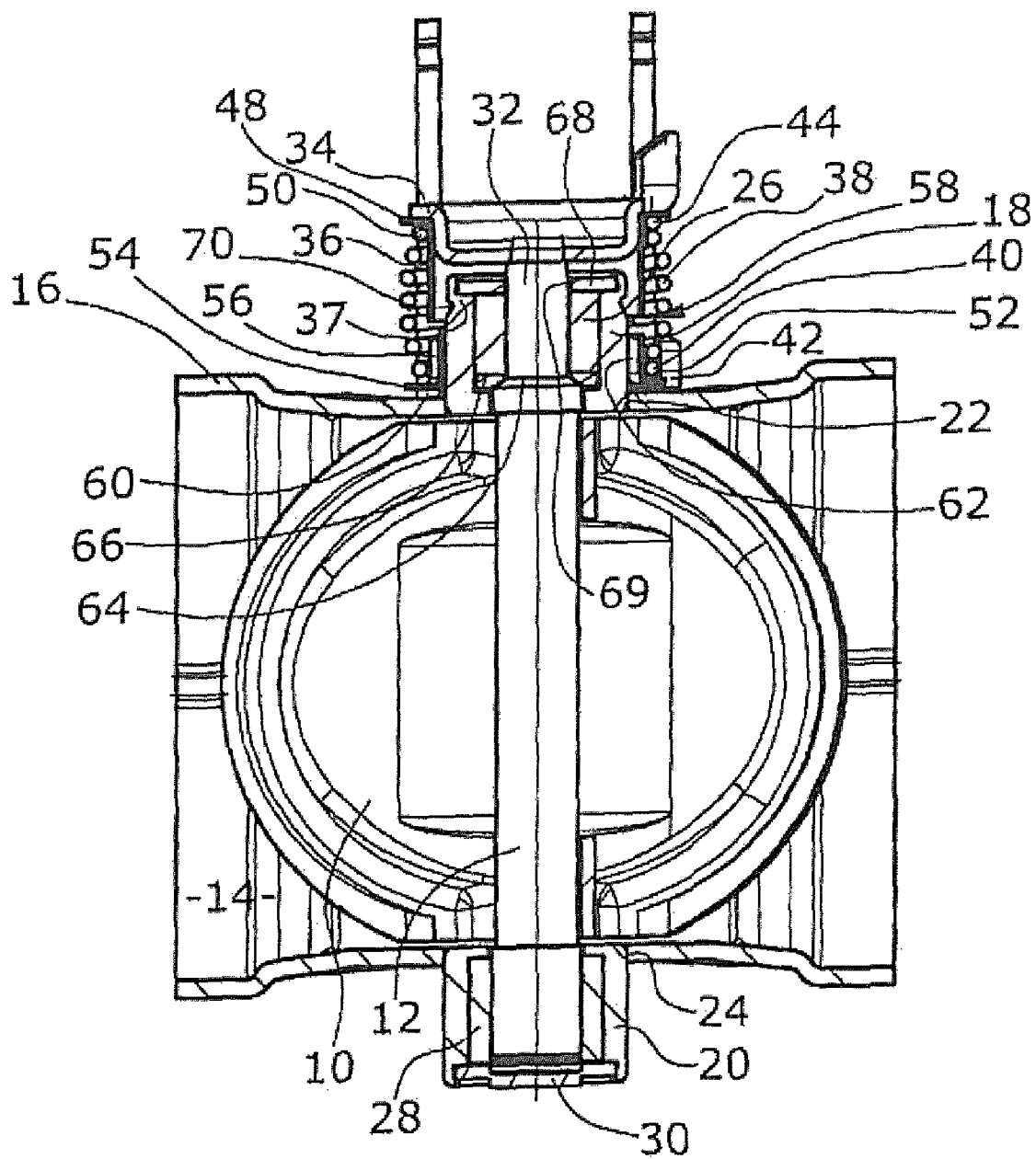
FIG. 1 shows a lateral sectional view of an exhaust gas flap comprising a flap bearing system according to the present invention.
Figure 2:
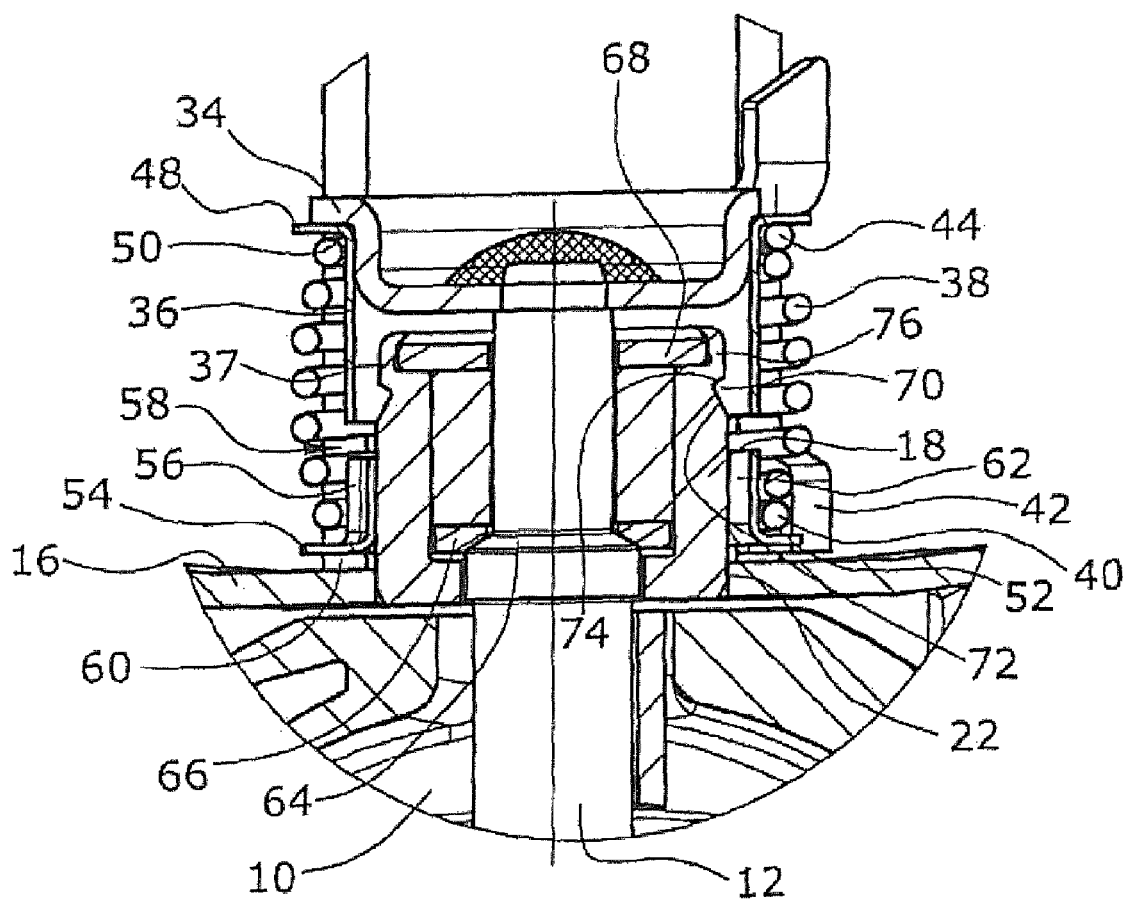
FIG. 2 shows a portion of the flap bearing system of the exhaust gas flap from FIG. 1 in a sectional view.

By providing a circumferential groove formed at the outer circumference at the section of the bearing housing that is surrounded by the sleeve, wherein the flap shaft end protruding from the bearing housing is arranged geodetically at the same height or above the opposite flap shaft end, splash water entering the bearing area through the gap between the sleeve and the bearing housing is collected in the groove and, under the effect of gravity, is conveyed back to the gap along the groove. In this manner, intrusion into the gap between the shaft and the bearing is largely prevented, thus extending the useful life of the flap bearing system.

In an embodiment of the present invention, the groove can, for example, be asymmetric in cross section, wherein the first cross-sectional wall arranged closer to the flap body encloses a smaller angle to the circumferential wall of the bearing housing than the adjacent second cross-sectional wall of the groove that is arranged farther away from the flap body. Splash water can thereby flow into the groove with small deflection and thus with small resistance, whereas the resistance against overflowing the groove in the direction of the flap shaft end is increased. The discharge of the splash water is correspondingly improved.

This is safeguarded particularly in that the angle between the first cross sectional wall and the circumferential wall is smaller than 45° and the angle between the second cross sectional wall and the circumferential wall is larger than 45°.

In an embodiment of the present invention, a sliding disk can, for example, be arranged in the bearing housing which surrounds the flap shaft and is in axial abutment against a conical or tapered shoulder of the flap shaft, wherein the radial bearing is arranged axially between the sliding disk and the bearing housing cover. This configuration distinctly reduces ingress of exhaust gas into the area of the radial bearing along the flap shaft since the sliding disk will act as a sealing on the flap shaft.

A fulcrum bracket is further fastened to the flap shaft end which is connected to an actuating member so that the actuator device can be arranged at a distance from the flap shaft, thus reducing the thermal stress of the actuator device.

Care must be taken in regard thereto that the fulcrum bracket is fastened to the flap shaft end in a fluid-tight manner to prevent splash water moving along the shaft and via the opening of the fulcrum bracket from intruding into the interior of the bearing arrangement.

In an embodiment of the present invention, the sleeve can, for example, extend from the fulcrum bracket in the direction of the bearing housing so that no additional sealing elements is required for preventing ingress of water along the shaft between the sleeve and the fulcrum bracket.

The bearing unit can be mounted and fixed in a simple manner if the bearing housing cover is attached to the bearing housing in a form-fitted or substance-bonded manner.

In an embodiment of the present invention, the bearing housing can, in sections, be radially surrounded by a spring support sleeve comprising a radial annular extension, with a restoring spring arranged in axial abutment thereon. A thermal overstressing of the spring can thereby be prevented by avoidance of a direct abutment of the spring on the hot channel housing, and the gap through which water may happen to pass to the bearing housing can be narrowed so that the quantity of splash water reaching the bearing housing can generally be reduced.

The thermal stress on the restoring spring is additionally reduced by providing the spring support sleeve with at least three abutment knobs via which the spring support sleeve is in axial abutment against the channel housing since the abutment surface area is thereby reduced, which in turn decreases heat transmission.

In an embodiment of the present invention, the spring support sleeve can, for example, comprise at least three abutment knobs via which the spring support sleeve is in radial abutment against the bearing housing. By this measure, the heat transmission between the housing and the spring support sleeve, and thus the restoring spring, will also be reduced and the thermal stress on the spring will be lowered.

In an embodiment of the present invention, the restoring spring can, for example, comprise a first spring leg arranged in abutment on an abutment element on the channel housing, and a second spring leg formed on the opposite end of the restoring spring, which is in abutment on an abutment element on the fulcrum bracket. The restoring movement of the flap into an emergency-run position upon failure of the actuator, but also in operation for setting a defined position, will thus be safeguarded.

In an embodiment of the present invention, on the side of the channel housing radially opposite to the first bearing housing, a second bearing housing can, for example, be formed internally of which a second radial bearing for bearing support of the flap shaft is arranged. A bilateral support is thereby achieved which will safeguard a permanently smooth-running quality of the rotation of the flap with a good sealing tightness in the closed state.

A flap bearing system of the above design for a flap shaft in a motor vehicle has a long useful life since an ingress of splash water into the gap between the flap shaft and the bearings is distinctly reduced. Deposits in this area upon evaporation of water will correspondingly be reduced. Splash water which has intruded into the gas between the sleeves will again be discharged.

An exemplary embodiment of an exhaust gas flap comprising a flap bearing system for a flap shaft in a motor vehicle as provided by the present invention will hereinafter be described under reference to the drawings.

The device illustrated in FIG. 1 comprises a valve body 10 arranged for rotation on a flap shaft 12 in an exhaust gas channel 14 which is radially delimited by a channel housing 16.

On opposite ends of exhaust gas channel 14, flap shaft 12 extends through channel housing 16 into a first bearing housing 18 and second bearing housing 20 which are welded in corresponding openings 22, 24 of channel housing 16. Bearing support of flap shaft 12 is realized in the first bearing housing 18 via a first radial bearing 26 and in the second bearing housing 20 via a second radial bearing 28. The second bearing housing 20 will be fully closed from the outside by a cover element 30 so that an ingress of water from the outside is excluded at this side.

To allow for actuation of the exhaust gas flap, flap shaft 12 extends by its flap shaft end 32 out from the first bearing housing 18. Fastened to the flap shaft end 32 is a substantially pot-shaped fulcrum bracket 34 which on its opposite end is connected to an actuating member (not shown) which, upon actuation, will move the fulcrum bracket 34 and thus the flap shaft 12 with the valve body 10 around the rotational axis. Attachment of the fulcrum bracket 34 on flap shaft end 32 is realized e.g., by riveting or welding. Care should thereby be taken that the central opening in the fulcrum bracket 34 having the flap shaft end 32 passing through it is designed with a sealing tightness relative to flap shaft end 32 so that no liquid, by passing along flap shaft 12 and via a gap between fulcrum bracket 34 and flap shaft end 32 is allowed to intrude into the bearing area.

The fulcrum bracket 34 is radially surrounded by a sleeve 36 extending in the direction of channel housing 16 and also radially surrounding an axial section 37 of bearing housing 18. This sleeve 36 at the same time serves as guidance for a restoring spring 38 which surrounds the sleeve 36 and whose first spring leg 40 is in abutment against an abutment element 42 on channel housing 16 and whose second spring leg 44 is in abutment against an abutment element (not visible in the sectional view) on fulcrum bracket 34 so that, upon rotation of flap shaft 12, the restoring spring 38 will be biased and the energy stored in the restoring spring 38 will restore the flap shaft 12 into its starting position without the need to apply a rotational moment by the actuating member.

While the restoring spring 38 by its first winding 50 is in axial abutment against an annular extension 48 of sleeve 36, it is by its last winding 52 in abutment against a radial annular extension 54 of a spring support sleeve 56 running in the direction of sleeve 36 and guiding this section of the restoring spring 38. Between the sleeve 36 and the spring support sleeve 56, a gap 58 remains so that, in case of thermal expansion or in case of contraction of restoring spring 38, a mutual contacting of sleeve 36 and spring support sleeve 56 is avoided because such contacting could affect the functionality of the exhaust gas flap.

By means of the restoring spring 38, the spring support sleeve 56 is pressed against the channel housing 16 wherein, for avoidance of a heat transmission from channel housing 16 to spring support sleeve 56 and from there to restoring spring 38, the spring support sleeve 56 is supported on channel housing 16 not in full-faced abutment but only via individual abutment knobs 60. A too large abutment surface toward the first bearing housing 18 is also avoided in that the interior of the spring support sleeve 56 is provided with abutment knobs 62 by which the spring support sleeve 56 is in abutment against the bearing housing 18. In this manner, the position of spring support sleeve 56 is fixed without causing heat transmission surfaces toward the restoring spring 38.

The restoring spring 38 is in a state of a slight axial bias between the annular extension 48 and the radial annular extension 54 of sleeve 36 and the spring support sleeve 56 so that the flap shaft 12 is biased via the fulcrum bracket 34 in the direction of the first bearing housing 18. Flap shaft 12 comprises a conical shoulder 64 whose smaller cross sectional surface in first bearing housing 18 is facing toward first radial bearing 26. This conical shoulder 64 is abutted by a sliding disk 66 which is shaped in correspondence thereto and which is correspondingly biased by the restoring spring 38 against the conical shoulder 64 of flap shaft 12. The conical shoulder 64 as well as the corresponding sliding disk 66 can also have a spherical shape.

The opposite side of the sliding disk 66 is in abutment on the first radial bearing 26 which in turn, by means of sliding disk 66 and, respectively, conical shoulder 64 and restoring spring 38, is pressed against a bearing housing cover 68, the bearing housing cover 68 closing the first bearing housing 18 and being fastened thereto in a form-locked manner at the axial end of first bearing housing 18. In bearing housing cover 68, an opening 69 is formed, having the valve shaft 12 extending there-through to the outside. Since the valve shaft 12 must be rotatable relative to the bearing housing cover 68, a gap is to be provided here while, through this gap, water intruding through gap 58 into the area of the bearing housing may happen to proceed along valve shaft 12 toward the radial bearing 26.

In order to prevent this, the present invention provides that the outer circumference of first bearing housing 18, which first bearing housing 18 is geodetically arranged at the same height as the second bearing housing 20 or below the latter, is formed with a circumferential groove 70, notably in that axial section 37 which is radially surrounded by sleeve 36. Groove 70 comprises two opposite cross sectional walls (first cross-sectional wall 72 and second cross-sectional wall 74) of which the first cross-sectional wall 72 that is arranged closer to channel housing 16, is oriented at an angle of about 30° relative to a circumferential wall 76 of bearing housing 18, while the second cross-sectional wall 74 that is arranged closer to fulcrum bracket 34, is oriented at an angle of about 60° relative to a circumferential wall 76 of bearing housing 18. This results in a correspondingly asymmetric cross-sectional shape of groove 70.

If, now, the exhaust gas flap is exposed to splash water, the bulk of the splash water is prevented, by sleeve 36 and spring support sleeve 56, from intruding into the bearing area. Some residual splash water will, however, reach the bearing housing via the gap 58 between sleeve 35 and spring support sleeve 56 and will flow along the bearing housing. The major part of this intruding water must, however, always take the path along the circumferential wall 76 of first bearing housing 18 for reaching the flap shaft 12. On this route, however, the splash water will enter the groove 70 and, due to the small angle of the circumferential wall 76 relative to the first cross sectional wall 72 of groove 70, will be moved without larger resistance in the direction of the bottom of the groove 70 where it will be collected. A continued flow in the axial direction of the shaft 12 along the circumferential wall 76 through the groove 70 is prevented due to the angle relative to the second cross sectional wall 74 and the resultant high flow resistance. In correspondence to the smallest flow resistance and the highest pressure gradient, the water will thus flow along the groove 70 in a downward direction and at the geodetically lowest area of the groove 70 will drop out from the latter onto the inner circumference of sleeve 36 and, via gap 58, will leave the bearing area again without reaching the gap 58 between the flap shaft 12 and the bearing housing cover 68.

It is thereby largely prevented that splash water moving along valve shaft 12 will intrude into the area of the first radial bearing 26 or of the sliding disk 66 and, due to the heat, will evaporate there, causing contamination from the splash water to become deposited on the valve shaft 12 with resultant impairment of rotatability of the latter and damage to the bearing. The durability and the useful life of such a flap bearing system will correspondingly be markedly improved.

It should be evident that the scope of protection is not limited to the described exemplary embodiment. It is in particular possible to use the present invention for bearing systems of various designs comprising ball bearings, ceramic bearings, needle bearings or slide bearings, axial bearings or radial bearings as well as different combinations thereof. Other uses than that for an exhaust gas flap can also be contemplated without leaving the protective scope of the claims. Reference should also be had to the appended claims.

What is claimed is:

1. A flap bearing system for a flap shaft in a motor vehicle, the flap bearing system comprising:
    a flap shaft comprising a flap shaft end;
    a flap body arranged on the flap shaft and configured to rotate;
    a first radial bearing with the flap shaft arranged therein;
    a channel housing configured so that a flow cross-section hereof is controllable by rotating the flap shaft with the flap body;
    a first bearing housing configured to radially surround the first radial bearing;
    a bearing housing cover comprising an opening configured to have the flap shaft end protrude there-through, the bearing housing cover being configured to axially close the first bearing housing;
    a sleeve configured to radially surround at least a section of the first bearing housing;
    a gap arranged between the sleeve and the first bearing housing; and
    a circumferential groove formed at an outer circumference at the section of the first bearing housing surrounded by the sleeve, wherein, the flap shaft end protruding from the first bearing housing is arranged geodetically so as to be at a same height or above an opposite flap shaft end.

2. The flap bearing system as recited in claim 1, wherein, the first bearing housing comprises a circumferential wall, the circumferential groove comprises a cross section which is asymmetric, a first cross-sectional wall, and a second cross-sectional wall, the first cross-sectional wall being arranged so as to be closer to the flap body than the second cross-sectional wall arranged adjacent thereto, and an angle of the first cross-sectional wall to the circumferential wall is smaller than an angle of the second cross-sectional wall to the circumferential wall.

3. The flap bearing system as recited in claim 2, wherein the angle of the first cross-sectional wall to the circumferential will is smaller than 45°.

4. The flap bearing system as recited in claim 2, wherein the angle of the second cross sectional wall to the circumferential wall is larger than 45'.

5. The flap bearing system as recited in claim 1, wherein, the flap shaft further comprises a conical or tapered shoulder, and further comprising a sliding disk arranged in the first bearing housing, the sliding disk being configured to surround the flap shaft and to axially abut against the conical or tapered shoulder, wherein the first radial bearing is arranged axially between the sliding disk and the bearing housing cover.

6. The flap bearing system as recited in claim 1, wherein the bearing housing cover is attached to the first bearing housing in a form-fitted manner or a substance-bonded manner.

7. The flap bearing system as recited in claim 1, further comprising a fulcrum bracket and an actuating member, wherein the fulcrum bracket is fastened to the flap shaft end and is connected to the actuating member.

8. The flap bearing system as recited in claim 7, wherein the fulcrum bracket is fastened to the flap shaft end in a fluid-tight manner.

9. The flap bearing system as recited in claim 7, wherein the sleeve is configured to extend from the fulcrum bracket in a direction of the first bearing housing.

10. The flap bearing system as recited in claim 7, further comprising:
a spring support sleeve comprising a radial annular extension; and
a restoring spring arranged in an axial abutment on the spring support sleeve;
wherein, the first bearing housing comprises sections which are radially surrounded by the spring support sleeve.

11. The flap bearing system as recited in claim 10, wherein the spring support sleeve further comprises at least three abutment knobs which are configured to axially abut the spring support sleeve against the channel housing.

12. The flap bearing system as recited in claim 10, wherein the spring support sleeve further comprises at least three abutment knobs which are configured to radially abut the spring support sleeve against the first bearing housing.

13. The flap bearing system as recited in claim 10, wherein,
the channel housing comprises a channel housing abutment element,
the fulcrum bracket comprises a fulcrum bracket abutment element, and
the restoring spring comprises a first spring leg configured to abut on the channel housing abutment element, and a second spring leg formed on an opposite end of the restoring spring and configured to abut on the fulcrum bracket abutment element.

14. The flap bearing system as recited in claim 1, further comprising:
a second bearing housing arranged on a side of the channel housing radially opposite to the first bearing housing; and
a second radial bearing formed internally of the second bearing housing, the second radial bearing being configured to provide for a bearing support of the flap shaft.

* * * * *